United States Patent [19]

Mayer

[11] 4,340,429
[45] Jul. 20, 1982

[54] PROCESS FOR IMPROVING THE FILTERABILITY OF VISCOSES

[75] Inventor: Reinhart Mayer, Kelheim, Fed. Rep. of Germany

[73] Assignee: Hoechst Aktiengesellschaft, Frankfurt am Main, Fed. Rep. of Germany

[21] Appl. No.: 192,013

[22] Filed: Sep. 29, 1980

Related U.S. Application Data

[63] Continuation of Ser. No. 3,909, Jan. 15, 1979, abandoned.

[30] Foreign Application Priority Data

Jan. 17, 1978 [DE] Fed. Rep. of Germany ....... 2801820

[51] Int. Cl.$^3$ .......................... C08J 3/02; C08J 3/04; C08L 1/22; C08L 1/24
[52] U.S. Cl. .................................. 106/164; 106/165; 264/188; 536/60; 536/61
[58] Field of Search ................ 106/164, 165; 264/188; 536/60, 61

[56] References Cited

U.S. PATENT DOCUMENTS

| | | | |
|---|---|---|---|
| 1,917,646 | 7/1933 | Herrmann | 106/165 |
| 2,985,647 | 5/1961 | Von Kohorn | 106/165 |
| 4,158,698 | 6/1979 | Geyer, Jr. et al. | 536/60 |

FOREIGN PATENT DOCUMENTS 1121271 1/1962 Fed. Rep. of Germany .

OTHER PUBLICATIONS

Lange, *Handbook of Chemistry*, Handbook Publishers, Inc., Sandusky, Ohio, 1956, p. 1803.

*Primary Examiner*—Allan Lieberman
*Attorney, Agent, or Firm*—Curtis, Morris & Safford

[57] ABSTRACT

The invention provides a process for improving the solution state (filterability) of viscoses, wherein mashing of the alkali cellulose-xanthate with dilute sodium hydroxide solution or water and/or dissolving of the xanthate by agitation, disintegration or pump circulation etc. is carried out under an overpressure of from about 1 to 30 bar.

7 Claims, No Drawings

PROCESS FOR IMPROVING THE FILTERABILITY OF VISCOSES

This is a continuation of application Ser. No. 003,909, filed Jan. 15, 1979 and now abandoned.

In the well-known manufacture of shaped articles such as filaments, fibers, films or sheets from regenerated cellulose according to the viscose process, it is of decisive importance for the profitability of this process that the specific consumption of chemicals is reduced to a minimum. Attempts have therefore been made to prepare for example so-called economy-type viscoses, that is, spinnable solutions of alkali cellulose-xanthate in dilute sodium hydroxide solution or water, the alkali ratio (ratio of NaOH content to cellulose content in percent by weight) of which has been reduced to values of below 0.6, and optionally, too, the amount of carbon disulfide.

The result of reducing the alkali ratio (AR) of viscoses is that not only the specific NaOH consumption but also the specific sulfuric acid consumption in the spining bath system and thus the expenses for spinning bath regeneration and sodium sulfate discharge can be decreased. A lower amount of carbon disulfide, relative to the quantity of cellulose used as starting material or to the regenerated cellulose produced, results of course in an additional relief on the exhaust air cleaning installation.

However, in the preparation of viscoses even without applying economizing conditions, the production of homogeneous spinning solutions is a serious problem, because even with agitation, pump circulation or disintegration it is impossible to dissolve the cellulose-xanthate quantitatively. In any case, there remain small amounts of glutinous substances swollen but only partially dissolved, which have to be eliminated from the high-viscosity solution by repeated filtration. The solution state, that is, essentially the filterability, of viscoses, however, is deteriorated in such a manner by a reduced AR that the preparation of homogeneous, spinnable viscoses would be possible with inadmissible filtration expenditure only.

The AR of viscoses can be reduced nearly exclusively by decreasing the NaOH content of the alkali cellulose. Decrease of concentration or increase of temperature of the steeping liquor used or adjustment of a higher press/weight ratio of the alkali cellulose results inevitably in an insufficient solution state of the viscose produced therefrom. Perhaps, according to the process of German Offenlegungsschrift No. 1,924,804, reduction of the NaOH content of the alkali cellulose does not inevitably deteriorate the filterability of the viscoses obtained therefrom. However, this process needs a second alkalization operation after ageing, and it is thus very expensive not only because of apparatus, but also because of the energy required in addition.

It has now been surprisingly found that, using the normal alkalization and sulfidation equipment, viscoses and especially economy-type viscoses having an excellent solution state (filterability) are obtained when mashing of the alkali cellulose-xanthate and/or dissolving of this xanthogenate in dilute sodium hydroxide solution or water is carried out under a pressure which should be from about 1 to 30, preferably 2 to 15, bar. Especially good results are obtained under a pressure in the range of from 3.5 to 10 bar (a pressure of 1 bar corresponds to 1.02 kg/cm$^2$ or 14.5 psi (1 lb/squ. in.).

This pressure should be maintained during the entire mashing and dissolving operations, which can be done in a simple manner for example in the case where the xanthate is prepared in barattes (dry churns) and subsequently dissolved in sodium hydroxide solution or water in separate viscose dissolvers with agitation and, simultaneously, under pressure.

According to certain known viscose processes, the xanthogenate is mashed in the sulfidation apparatus already, which are generally not designed as pressure tanks. In these cases it is recommended to continue dissolving the mashed and optionally partially dissolved xanthogenate, immediately after having forwarded it to the dissolver, under pressure and with simultaneous agitation, pump-circulation and/or disintegration. In principle, it is important to maintain an overpressure during the time of mashing and/or dissolving, where free carbon disulfide not being linked to the cellulose is still present.

The superatmospheric pressure can be established according to different known methods. For example, nitrogen, air or other suitable gas or gas mixture may be pressed into dissolving vessels, such as autoclaves, or to establish the pressure by means of suitable feed devices, for example pumps.

Depending on the degree of superatmospheric pressure and the start of its application, the time of treatment under pressure may vary. For example, an improved solution state of viscoses so treated is observed after less than 1 minute at a pressure of 10 bar, while under a pressure of 2 bar only, a corresponding improvement is observed after at least 1 minute of pressure treatment.

It has been found that the solution state of viscoses is the more improved the higher the pressure is. Especially good results were obtained at a superatmospheric pressure of from 3.5 to 10 bar and treatment times of from 15 to 60 minutes. When the pressure is raised above 10 bar, for example to 30 bar, further improvement of the solution state is observed. However, since increasing pressure requires increased expenditure for corresponding apparatus, a pressure above 30 bar is likely to be unpractical.

A similar dependence has been found with respect to the time of treatment. As already mentioned above, a clearly discernible improving effect is observed after a time below 1 minute in an early phase of dissolution when using high pressure. This increased solution state can be further improved by a prolonged time of treatment under superatmospheric pressure. This time may exceed 180 minutes without any difficulty; however, the percentage of improvment is only insignificant beyond this limit.

It has furthermore been found that it is necessary to maintain a constantly uniform pressure in order to improve the dissolution. Depending on the apparatus used, different pressure levels may be applied; application and maintenance of a higher pressure at the start of dissolution being however recommended. If desired, intermittent pressure treatment of the viscose is likewise possible, that is, the viscose is subjected to the pressure for a short time, then depressurized to normal pressure, and this turn is correspondingly repeated. Also in this case, the total time of pressure treatment during the dissolution operation should be from 1 to 180 minutes, preferably 15 to 60 minutes.

The process as described for improving the solution state of viscoses is not limited to the dissolution operation of economy-type viscoses, but it is furthermore suitable for the preparation of homogeneous, spinnable viscoses from incompletely purified cellulose pulps, and for improving the filterability of viscose batches the solution state of which has been deteriorated by operational flaws.

When using incompletely purified cellulose pulps, processing according to the invention is possible by steeping and xanthation under normal conditions, that is, generally not under economy-type conditions, and subsequent dissolution according to the process of the invention.

In the case of viscose batches containing large amounts of swollen substances and other glutinous impurities, a posterior improvement of their solution state can be attained by a repeated treatment of such a solution under pressure according to the process of the invention, optionally after having added further carbon disulfide to the batch.

The effect of the process of the invention is supposed to be due to a higher conversion rate of the carbon disulfide/cellulose reaction than that attained in the hitherto known processes. As is generally known, in the viscose process the carbon disulfide is not only linked to the cellulose in its xanthate form. Part of the carbon disulfide is subjected to the known side reactions yielding for example sodium trithiocarbonate. For example, after sulfidation and dissolution under normal pressure according to the usual processes, when using about 36 to 37 weight % of carbon disulfide relative to the cellulose content of the alkali cellulose, about 88% only of the carbon disulfide used is linked to the cellulose. By operating, however, according to this invention, that is, subjecting the fresh viscose to a pressure of 7 bar, 96% of the carbon disulfide used are linked to the cellulose after complete dissolution (determination of carbon disulfide linked to the cellulose according to Bredée, Kolloid. Z. 94 (1941), 85). Therefore, even when adding carbon disulfide later on, more xanthate groups activating the dissolution are probably formed.

For characterizing the solution state, the filter clogging constant was determined according to Hermans and Bredée, Rec.Trav.Chim.Pays-Bas 54, (1935), 680 et sequ.. For this test, the viscose is introduced into a cylindrical steel vessel (as described for example in Götze, Chemiefasern nach dem Viskoseverfahren, 3rd edition (1967), vol. II, 1115, FIG. 783) and filtered through 3 layers of cotton batiste (fabric construction: warp 52 threads/cm, filling 49 threads/cm; weight 84 g/m²) under a constant pressure of 2.0 atm/gge. In this test filtration, the effective filter area is 8.77 cm². That amount of filtrate is measured which is obtained within a filtering time of from 0 to 20 minutes ($p_1$) and a filtering time of from 20 to 60 minutes ($p_2$). The clogging constant is therefore calculated according to the following equation:

$$K_w = 100,000(2 - P_2/P_1)/(P_2 + P_1)$$

According to a comparison with filtration in the industrial practice, the $K_w$ value measured can be given the following marks:

| $K_w$-value | Filterability |
|---|---|
| <300 | very good |
| 300–500 | good |
| 500–800 | hindered |
| 800–1,000 | poor |
| >1,000 | practically not filterable any more. |

The following Examples illustrate the invention. The indication of details of analysis methods used was renounced; they can be found in the treatise of Götze, loc. cit., vol. 2, chapter 42 and 43. Amounts and percentages are by weight unless otherwise stated.

EXAMPLE 1

Starting material for a series of tests was a beech sulfite cellulose pulp containing 91.2% of alpha-cellulose at an average degree of polymerization (DP) of 820. In all cases, the DP was determined by emulsion xanthogenation according to Jayme-Wellm, Das Papier 11 (1957), 77–82.

In all cases, operations were as follows: sheets of the cellulose pulp were steeped in a soaking press of Messrs. Blaschke, Endersbach, W. Germany; the steeping time being 30 minutes at 55° C. A steeping liquor containing 190 g/l of NaOH and 30 g/l of hemicellulose was used. After pressing and shredding, an alkali cellulose containing 35.0% of cellulose and 14.0% of NaOH was obtained. During the subsequent ageing of the alkali cellulose at 55° C. and an ageing time of 8.5 hours, the DP had dropped to 305. Xanthation was carried out for 90 minutes at 30° C. in evacuated vessels. The carbon disulfide amounts varied in the range of from 34 to 37%; they are listed in the following Table.

The xanthates so obtained were subjected to diverse dissolution conditions. In all cases, water and dilute sodium hydroxide solution were added in an amount which ensured a cellulose content of 9.0% of the viscoses obtained, while the NaOH content and the alkali ratio (AR) of the viscoses varied.

Dissolving operations according to the state of the art: in open vessels, on the one hand with the use of a propeller agitator driven at 1,370 rpm, the treatment time being 2.5 and 5 hours, respectively. On the other hand, viscoses were subjected for 5 hours to the action of a disintegrator (Condux disk mill).

Dissolving according to the process of the invention: likewise according to two diverse operation modes. In the first case, dissolving began by mashing in an autoclave provided with a propeller agitator device running at low speed (about 100 rpm). After having added the required amounts of water and dilute sodium hydroxide solution, the autoclave was pressurized with nitrogen. A pressure of 7 was maintained during the entire dissolution time of 2.5 hours. In the second test series, the alkali cellulose-xanthate was first mashed with water and sodium hydroxide solution by means of an agitator and under normal pressure, and subsequently forced by means of a gear pump into a vessel provided with a spill valve (pressure control valve) adjusted to a pressure of 2 bar. The viscose let off from the valve flowed back to the pressureless mashing vessel and, by means of the gear pump, was forwarded again into the pressure zone. The total dissolution time was 2–5 hours also in this case; the viscose having been subjected to the superatmospheric pressure of 2 bar for an average 25 minutes.

The diverse process conditions and the data of the filter clogging constant $K_w$ obtained are listed in the following Table.

| Alkali ratio of viscose | % CS2 | Filter clogging constant Kw under diverse conditions | | | | |
|---|---|---|---|---|---|---|
| | | 2.5 hrs. dissol. time with agitator | 5 hrs. dissol. time with agitator | 5 hrs. dissol. time with disintegrator | 2.5 hrs. dissol. time; pressure after gear pump 2 bar | 2.5 hrs. dissol. time in autoclave 7 bar |
| 0.55 | 37 | 800 | 660 | 600 | 420 | 280 |
| 0.45 | 37 | 950 | 690 | 640 | 425 | 310 |
| 0.40 | 37 | 1,160 | 820 | 805 | 435 | 320 |
| 0.40 | 34 | 3,400 | 1,800 | 1,655 | 610 | 330 |

It results clearly from the data of the Table that application of pressure according to this invention during the mashing and/or dissolving operations gives a considerably improved solution state. Especially, viscoses can be prepared under economy-type conditions which have still a good filterability.

EXAMPLE 2

Under the same conditions of steeping, ageing and xanthation as indicated in Example 1, alkali cellulose-xanthates were prepared from 3 beech sulfite cellulose pulps containing diverse amounts of alpha-cellulose and ashes, which xanthates were then mashed and dissolved under varied conditions, too. The following cellulose pulps were used:

| Cellulose pulps | A | B | C |
|---|---|---|---|
| α-cellulose content % | 93.2 | 90.3 | 87.8 |
| ashes % | 0.054 | 0.11 | 0.16 |

The xanthogenates obtained were dissolved within 2.5 hours with the calculated amount of water and dilute sodium hydroxide solution in an open vessel by means of a propeller agitator (about 1.370 rpm).

In a parallel test series, mashing and dissolution were carried out according to the invention in an autoclave provided with agitator device running at low speed (about 100 rpm), while maintaining a pressure of 9 bar by means of compressed air during the complete mashing and dissolving time.

In a third test series, the xanthate was mashed under normal pressure with the aid of a propeller agitator. The mashed xanthate was subsequently forwarded directly by means of a gear pump into a zone where a pressure of 9 bar was maintained by means of a pressure-control valve. This pressure zone was designed in such a manner that only part of the total viscose amount could be fed in. Therefore, the fresh viscose remained for a certain time only in this zone and then flowed back via the pressure-regulating valve into the pressureless receiver vessel of the gear pump, in order to be again forwarded by the gear pump into the pressure zone. The total dissolution time was 2.5 hours, too, in this test series; however, the total average residence time of the viscose under a pressure of 9 bar was 19 minutes only.

In all cases, viscoses were prepared using 37% of carbon disulfide; the alkali ratio of the viscoses being 0.6 and the cellulose concentration 9.0%.

In order to determine the solution state of the diverse viscoses, the filter clogging constant $K_w$ was again measured. The data as listed below were obtained:

| Cellulose | Filter clogging constant $K_w$ after | | |
|---|---|---|---|
| | 2.5 hours dissol. time with agitation | 2.5 hours dissol. time pressure after gear pump 9 bar | 2.5 hours dissol. time in autoclave 9 bar |
| A | 450 | 180 | 170 |
| B | 1,210 | 360 | 280 |
| C | 1,620 | 385 | 305 |

The viscose prepared within 2.5 hours from cellulose C with agitation and under normal pressure was subsequently after-dissolved for 2.5 hours under a pressure of 9 bar, thus improving considerably its solution state. After this redissolving, the viscose so treated had a filter clogging constant $K_w$ of 370. When a further amount of 2.0% of carbon disulfide relative to the celllulose content of the viscose was added to the above viscose, and the batch was subjected for 2.5 hours to a corresponding redissolving in an autoclave under a pressure of 9 bar, the solution state had improved again, so that the filter clogging constant $K_w$ was then only 195.

What is claimed is:

1. In a process for preparing a viscose solution by dissolving an alkali cellulose-xanthate in dilute sodium hydroxide solution or water, the improvement which comprises carrying out the dissolution step under an elevated pressure of from about 2 to 30 bars for a period of 1 to 180 minutes to improve the filterability of said solution.

2. The process defined in claim 1 wherein said elevated pressure is maintained for a period of 15 to 60 minutes.

3. The process defined in claim 1 wherein said elevated pressure is 3.5 to 10 bars.

4. The process defined in claim 1 wherein the dissolution of the xanthate is carried out by mashing it in dilute sodium hydroxide solution or water.

5. The process defined in claim 1 wherein the xanthate is dissolved by agitation, disintegration, pump circulation and the like.

6. The process defined in claim 1 wherein the xanthate is mashed with dilute sodium hydroxide solution or water and the pressure treatment is started immediately after mashing of the xanthate and continued for a period of 1 to 30 minutes.

7. The process defined in claim 1 wherein the xanthate is in a poor solution state, and after addition thereto of further carbon disulfide, is subjected to a renewed dissolving step by pump circulation, agitation, disintegration and the like.

* * * * *